(12) United States Patent
Robertson

(10) Patent No.: US 10,440,054 B2
(45) Date of Patent: Oct. 8, 2019

(54) CUSTOMIZED INFORMATION NETWORKS FOR DECEPTION AND ATTACK MITIGATION

(71) Applicant: Vencore Labs, Inc., Basking Ridge, NJ (US)

(72) Inventor: Seth Robertson, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 257 days.

(21) Appl. No.: 15/274,855

(22) Filed: Sep. 23, 2016

(65) Prior Publication Data

US 2017/0093911 A1 Mar. 30, 2017

Related U.S. Application Data

(60) Provisional application No. 62/232,968, filed on Sep. 25, 2015.

(51) Int. Cl.
*H04L 29/06* (2006.01)
*H04L 29/12* (2006.01)
(Continued)

(52) U.S. Cl.
CPC ...... *H04L 63/1491* (2013.01); *H04L 12/4641* (2013.01); *H04L 41/12* (2013.01);
(Continued)

(58) Field of Classification Search
CPC . H04L 63/20; H04L 63/1491; H04L 63/0407; H04L 41/12
See application file for complete search history.

(56) References Cited

U.S. PATENT DOCUMENTS

| | | | | |
|---|---|---|---|---|
| 6,658,487 B1 * | 12/2003 | Smith | ..................... | G06F 9/465 719/316 |
| 6,735,626 B1 * | 5/2004 | Tezuka | ..................... | H04L 41/00 370/396 |

(Continued)

OTHER PUBLICATIONS

Lichtblau, Franziska, et al. "Detection, classification, and analysis of inter-domain traffic with spoofed source IP addresses." Proceedings of the 2017 Internet Measurement Conference. pp. 86-89. ACM, 2017. (Year: 2017).*

(Continued)

*Primary Examiner* — Kari L Schmidt
(74) *Attorney, Agent, or Firm* — Heslin Rothenberg Farley & Mesiti P.C.

(57) ABSTRACT

A method, computer program product, and system for generating a unique (deceptive) view of a network, the method includes a processor generating, for a host on a computing network, a virtual network topology view, where the virtual network topology view of the network host differs from a physical network topology of the computing network, wherein the network node perceives the computing network as comprising a network topology of the virtual network topology view. The generating includes: the processor modifying naming and addressing services of network components communicatively coupled to the network host and transforming network flows between the network resources viewable by the network host in the virtual network topology view, to be consistent with the virtual network topology view.

20 Claims, 7 Drawing Sheets

(51) Int. Cl.
*H04L 12/46* (2006.01)
*H04L 12/24* (2006.01)

(52) U.S. Cl.
CPC ........ *H04L 61/103* (2013.01); *H04L 61/1511* (2013.01); *H04L 61/2007* (2013.01); *H04L 61/6022* (2013.01); *H04L 63/0407* (2013.01); *H04L 63/20* (2013.01); *H04L 41/0886* (2013.01); *H04L 41/145* (2013.01)

(56) References Cited

U.S. PATENT DOCUMENTS

| | | | | |
|---|---|---|---|---|
| 6,789,090 | B1* | 9/2004 | Miyake | H04L 41/0213 707/959 |
| 7,171,493 | B2* | 1/2007 | Shu | H04L 12/4633 709/238 |
| 7,721,211 | B1* | 5/2010 | Yehuda | G06F 15/177 715/734 |
| 8,045,481 | B2* | 10/2011 | Ong | H04L 45/00 370/254 |
| 8,576,845 | B2* | 11/2013 | Csaszar | H04L 29/12066 370/231 |
| 8,588,225 | B1* | 11/2013 | Ganesan | H04L 41/5054 370/389 |
| 8,805,971 | B1* | 8/2014 | Roth | G06F 9/5072 709/203 |
| 9,384,029 | B1* | 7/2016 | Brandwine | G06F 9/5077 |
| 9,432,282 | B2* | 8/2016 | Shenoi | H04L 12/40163 |
| 9,860,208 | B1* | 1/2018 | Ettema | G06F 21/602 |
| 10,009,287 | B2* | 6/2018 | Djukic | H04L 47/782 |
| 2003/0033402 | A1* | 2/2003 | Battat | G06F 3/0481 709/224 |
| 2003/0220867 | A1* | 11/2003 | Goodwin | G06Q 30/08 705/37 |
| 2007/0043943 | A1* | 2/2007 | Peretti | H04L 63/105 713/167 |
| 2008/0095176 | A1* | 4/2008 | Ong | H04L 45/00 370/400 |
| 2008/0098476 | A1* | 4/2008 | Syversen | H04L 63/0227 726/23 |
| 2009/0013281 | A1* | 1/2009 | Helfman | G06Q 10/10 715/788 |
| 2009/0285128 | A1* | 11/2009 | Swan | H04L 41/12 370/256 |
| 2009/0290513 | A1* | 11/2009 | Swan | H04L 41/0213 370/255 |
| 2010/0110932 | A1* | 5/2010 | Doran | H04L 41/12 370/254 |
| 2012/0317567 | A1* | 12/2012 | Bailey | H04L 41/04 718/1 |
| 2013/0073706 | A1* | 3/2013 | Iijima | H04L 67/18 709/223 |
| 2013/0132545 | A1* | 5/2013 | Schultze | H04L 41/00 709/223 |
| 2013/0227338 | A1* | 8/2013 | Lingafelt | H04L 41/0654 714/4.5 |
| 2014/0283051 | A1* | 9/2014 | Doron | H04L 63/1458 726/23 |
| 2015/0019756 | A1* | 1/2015 | Masuda | H04L 41/0896 709/242 |
| 2016/0019086 | A1* | 1/2016 | Lee | G06F 9/45558 718/1 |
| 2016/0294728 | A1* | 10/2016 | Jain | H04L 47/82 |
| 2016/0330080 | A1* | 11/2016 | Bhatia | H04L 41/12 |
| 2017/0324612 | A1* | 11/2017 | Perez | H04L 41/0806 |
| 2017/0358111 | A1* | 12/2017 | Madsen | H04L 41/0893 |

OTHER PUBLICATIONS

Roy, Arpan, Dong Seong Kim, and Kishor S. Trivedi. "Cyber security analysis using attack countermeasure trees." Proceedings of the Sixth Annual Workshop on Cyber Security and Information Intelligence Research. pp. 28. ACM, 2010. (Year: 2010).*

M. Cheminoda, et al. "A semi-graphical modeling framework for the automated analysis of networked systems security," 2015 IEEE 1st International Forum on Research and Technologies for Society and Industry Leveraging a better tomorrow (RTSI), Turin, 2015, pp. 411-418. (Year: 2015).*

* cited by examiner

FIG. 6

| Attack Element and Purpose | CINDAM Effect |
|---|---|
| Pivot Points: Unrestricted launch point for subsequent attacks | CINDAM restricts and deceives even internal nodes performing reconnaissance or attacking the network, lowering the advantage of compromising an internal node. |
| Redirectors: Make defender job harder by hiding true source of attack and by preventing detection of attack on one node from stopping entire attack mission. | CINDAM reverses this equation: adding internal redirectors make an attacker's job harder since each new node has a different view of the network, requiring research/customized software to utilize, and increases the likelihood of defensive techniques catching the attack. |
| Overlay Networks: Establish a stealthy bidirectional channel for communicating commands, attacks, and getting status and exfiltrating data. | CINDAM makes the addressing of each side of a connection asymmetric, preventing standard overlay network tools from working and preventing the attacker from establishing redundant network connections (since the IP address of other compromised nodes cannot be predicted by the attacker). Periodic network view reconfiguration breaks overlay connections and makes their re-establishment more difficult. This increases attack communication channel fragility and detectability. |
| Multiple Attackers: Parallelism allows greater stealth, larger effects, faster attacks, and attack redundancy. | Each attacker must gather individual (and inconsistent) network information, increasing detectability and attack planner confusion. Adding attackers in a CINDAM environment makes the attack less likely to be successfully carried out, unlike traditional networks. |
| Honeypot Avoidance: Compare resources used by multiple systems to discover resources that are not used by anyone (i.e., a honeypot). | Each system has a different network topology and IP addressing scheme, preventing resource comparisons. Network view reconfiguration also prevents historical comparison from being used by adversaries to identify unused resources. |
| Planning/Testing: Use gathered reconnaissance information to design the best method to achieve desired effects, and verify that attack will work in target environment. | Periodic network view reconfiguration invalidates gathered reconnaissance and plans based on that reconnaissance. Each CINDAM node used in the attack must be separately planned for since each is on an apparently different network. Attackers are forced to skip deliberate planning and testing, thus increasing risk of failure and detectability. |
| Low and Slow: Avoid triggering IDS by being slow enough to fall under detection thresholds. | Periodic network view reconfiguration invalidates gathered data. Attackers are forced to be fast and noisy, allowing IDS to catch them. |
| Indirect/Passive: Use infected mail attachments or social engineering to gain initial access to computer. | CINDAM does not stop such attacks. However, attempts to utilize gained access will be frustrated by CINDAM effects. |
| Man-on-the-side: Use network race attacks to achieve an effect by being faster than the real server. | The man-on-the-side will not be in the same network view as either the client or the server so cannot forge packets on their behalf for attacks within CINDAM protected enclaves. |

FIG. 7

CUSTOMIZED INFORMATION NETWORKS FOR DECEPTION AND ATTACK MITIGATION

CROSS-REFERENCE TO RELATED APPLICATIONS

This application claims priority to U.S. Provisional Application No. 62/232,968 filed Sep. 25, 2015, entitled, "CUSTOMIZED INFORMATION NETWORK FOR DECEPTION AND ATTACK MITIGATION SYSTEMS AND METHODS OF IN-BAND NETWORK CONFIGURATION" which is incorporated herein by reference in its entirety.

STATEMENT REGARDING FEDERALLY SPONSORED RESEARCH OR DEVELOPMENT

The disclosed invention was made with government support under contract # FA8750-15-C-0083 awarded by the Air Force Research Laboratory. The government has certain rights in the present invention.

FIELD OF INVENTION

The present invention relates to network security and specifically, creating different synthetic views of a network environment that can vary, per host, in order to conceal the real network's topography and protect it from an attack.

BACKGROUND OF INVENTION

Computer networks and the services deployed on them have become critical resources for many enterprises from corporations to the military, making them attractive targets for attackers. While the configuration of these networks are often considered "dynamic" for mobile client devices due to Dynamic Host Configuration Protocol (DHCP) the topology of these networks with respect to important targets such as servers, routers, and switches generally remains static for longer time periods. An attacker is able to collect topological information during a reconnaissance mission with the assurance that the information remains valid over a long planning cycle. This allows the adversary to develop, test, and refine targeted attacks to be deployed at the time of his choosing, thus providing a clear advantage and increased likelihood of success.

SUMMARY OF INVENTION

Shortcomings of the prior art are overcome and additional advantages are provided through the provision of method of implementing a group of diverse deceptive network views such that two hosts or groups of hosts on the network have different deceptive views of the network. The method includes: generating, by one or more processors, for a first network host on the computing network, a first virtual network topology view, wherein the first virtual network topology view of the first network host differs from a physical network topology of the computing network, wherein the network node perceives the computing network as comprising a network topology of the first virtual network topology view, the generating comprises: modifying, by the one or more processors, naming and addressing services of network components communicatively coupled to the first network host, wherein the modified network components comprise network resources viewable by the first network host in the first virtual network topology view, wherein the modifying maintains communications connections between the network resources; and transforming, by one or more processors, network flows between the network resources viewable by the first network host in the first virtual network topology view, to be consistent with the first virtual network topology view.

Additional features are realized through the techniques of the present invention, including but not limited to: 1) hiding the resources of the network (software and hardware) from view; 2) spoofing resources that do not exist; and/or 3) providing a unique addressing and topological representation of the network. In an embodiment of the present invention, the program code can readily change the view seen by a host, negating the value of any information previously collected by the attacker. In a further embodiment of the present invention, the program code can interleave honeypot resources with actual resources to help detect illegitimate accesses or dynamically divert detected attackers to a network that is solely a honeypot. The deceptive view of the network can be changed over time and the view of one host can be changed without affecting the deceptive view of another host.

Computer systems, computer program products, and methods relating to one or more aspects of the technique are also described and may be claimed herein. Further, services relating to one or more aspects of the technique are also described and may be claimed herein.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings. Throughout the drawings, aspects of various embodiments of the present invention are referred to as "CINDAM," which stands for Customized Information Networks for Deception and Attack Mitigation.

FIG. 6 illustrates some examples of how networks differ when aspects of the present invention are implemented therein.

FIG. 7 illustrates how embodiments of the present invention mitigate certain attacks on a network and/or its resources.

DETAILED DESCRIPTION OF THE INVENTION

Figure 1:
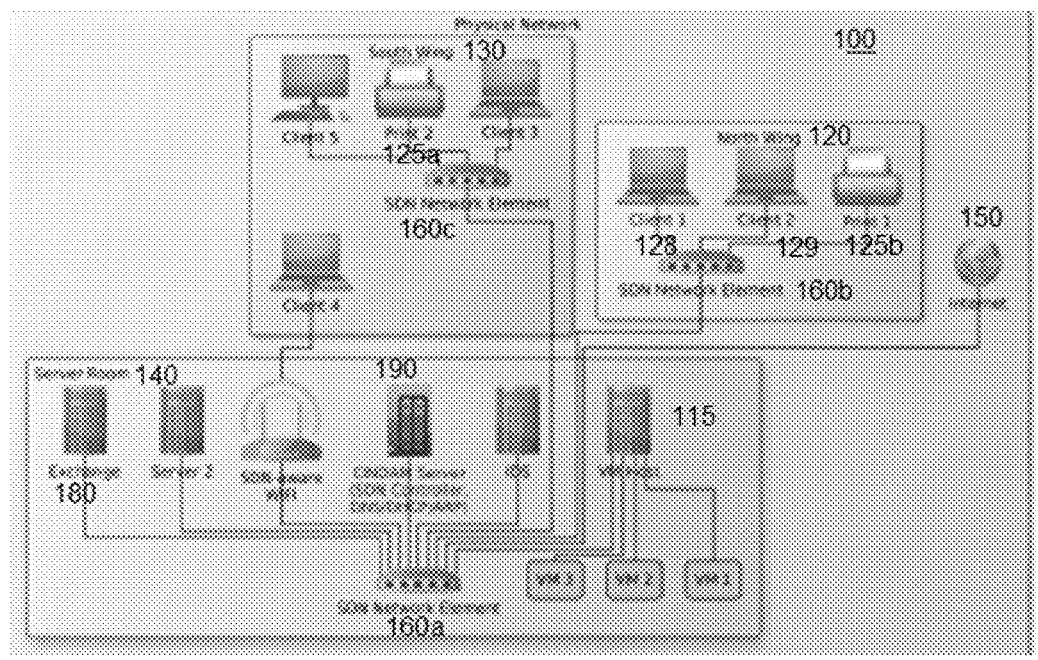
FIG. 1 depicts a physical network where aspects of the present invention can be implemented.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code.

The system, method, and computer program product described a cyber deception solution that enables a defender to adapt the apparent view of the network so that the attacker is unable to utilize the topology of the network and/or the real network resources to attack the network. One advantage of the present invention is that it disrupts a potential attacker and/or add cost to the attacker's attack almost every stage of the cyber kill chain from reconnaissance, to collaboration, to propagation.

In an aspect of the present invention, program code executing on at least one computer resource creates a unique, illusory view of the network for each host on the network. To create the individualized views, the program code may utilize one or more of the following approaches: 1) hide the resources of the network (software and hardware) from the view of each host; 2) spoof resources that do not exist; and/or 3) provide a unique addressing and topological representation of the network. In an embodiment of the present invention, the program code can readily change the view seen by a host, negating the value of any information previously collected by the attacker. In a further embodiment of the present invention, the program code can interleave honeypot resources with actual resources to help detect illegitimate accesses or dynamically divert detected attackers to a network that is solely a honeypot. As understood by one of skill in the art, a honeypot is a computer security mechanism set to detect, deflect, or, in some manner, counteract attempts at unauthorized use of information systems. Generally, a honeypot consists of data (for example, in a network site) that appears to be a legitimate part of the site but is actually isolated and monitored, and that seems to contain information, or a resource of value to attackers, which are then blocked. In an embodiment of the present invention, honeypots include resources that are items that appear to be actual resources in a given network, but are created by a controller to appear to an attacker on network views fabricated in embodiments of the present invention. Embodiments of the present invention include a method, computer program product, and system for generating a unique (deceptive) view of a network, the method includes a processor generating, for each a host on a computing network, a distinct virtual network topology view, where the virtual network topology view of the network host differs from a physical network topology of the computing network, wherein the network node perceives the computing network as comprising a network topology of the virtual network topology view. The generating includes: the processor modifying naming and addressing services of network components communicatively coupled to the network host and transforming network flows between the network resources viewable by the network host in the virtual network topology view, to be consistent with the virtual network topology view.

In an embodiment of the present invention, program code executing on at least one network resource generates per-host network topology views of a protected enclave with customized Internet Protocol (IP) addresses by using process-aware DHCP, domain name system (DNS), and address resolution protocol (ARP) services to provide a device-specific view of the IP addresses and topology in use, and device-specific, bi-directional network address translation (NAT) to allow devices to continue to communicate normally. The present invention achieves this deception without affecting network operations and without modifying client and server software. As understood by one of skill in the art, DHCP is a client/server protocol that automatically provides an IP host with its IP address and other related configuration information such as the subnet mask and default gateway. In an embodiment of the present invention the program code executing on a server referred to herein as the CINDAM server creates customized views using a variety of methods, including but not limited to random, round robin, and/or use of Distributed Assured Dynamic Configuration (DADC). DADC is described in commonly-owned U.S. application Ser. No. 15/199,018, filed Jun. 30, 2016, entitled "HYBRID SDN/LEGACY POLICY ENFORCEMENT" and U.S. application Ser. No. 15/199,242, filed Jun. 30, 2016, entitled "SYSTEMS AND METHODS OF IN-BAND NETWORK CONFIGURATION," which are hereby incorporated by reference in their entirety.

Certain embodiments of the present invention enable a defender (e.g., network and/or resource steward) to modify the view of the network in order to decrease the opportunity for a successful attack on the network. The present invention is useful to network security at least because it burdens and invalidates any reconnaissance performed by distracting the attacker and causing this attacker to expend resources to no effect, thus, increasing the chance that the attacker will be detected. Further advantages of certain embodiments of the present invention utilize honeypots, interleaving them with actual resources. Further embodiments of the present invention provide network security advantages by hiding actual network resources from the view of hosts while propagating the network view of a host with resources that do not actually exist on the network. Further embodiment of the present invention provide network security advantages by hiding all actual network resources from the view of hosts while replacing each actual network resource with honeypots or other virtualized or deceptive entities. Utilizing one or more of these aspects of embodiments of the present invention can enable a defender to detect an attacker and determine the attacker's intent.

FIG. 1 depicts a physical network 100 where aspects of the present invention can be implemented. The network of FIG. 1 is offered as an example in order to illustrate certain aspects of the present invention and is not meant to limit the type of networks or technical environments in which embodiments of the present invention may be implemented. For example, the present invention may be implemented in a variety of technical environments, including but not limited to, wired networks, wireless networks, hybrid networks, field area networks, data centers, and cloud computing environments. Although there are geographic delineators that are used to explain the location of network resources of this network 100, this particular placement of elements is non-limiting and merely offered to illustrate aspects of certain embodiments of the present invention. In this example, network resources of the network 100 include various resources situated in each of a North Wing 120, a South Wing 130, and a Server Room 140. Certain of the resources may be able to utilize the Internet 150, through an SDN network element 160a. In another embodiment of the present invention, the program code of the CINDAM Server 190 does not utilize SDN network elements.

Returning to FIG. 1, this network 100, offered as a non-limiting example, could be found, for example, in a department or small company. The network includes a group of hosts and printers, which in the example above, are situated in the North Wing 120 of this facility, a similar group in the South Wing 130, and several servers, including Virtual Machines (VMs), in the server room 140 along with a Software Defined Networking (SDN)-enabled WIFI gateway 160a and an Internet 170 connection. As understood by one of skill in the art, SDN Network Elements 160a-c may replace the traditional role of switches, routers, and WIFI gateways. A server, referred to herein as the CINDAM server 190, which may comprise one or more physical machines or may be a program resident on a computing node utilized for other functionalities as well, implements aspects of the present invention on the network 100, is also located in the server room 140. The resources that comprise a network 100 that it protected utilizing aspects of the present invention need not be located in the same physical environment, provided that each of the network elements are communicatively connected to other of the network elements. The CINDAM server 190, which may comprise hardware and/or software as program code executing aspects of the present invention, can access all resources of the network 100 in order to create individual and dynamic views of the network for the various devices that comprise the network 100.

In FIG. 1, code executed by at least one processor on the CINDAM server 190 provides each device on the network 100 a unique and deceptive view of this physical reality using modified naming and addressing services (e.g., DNS, DHCP, address resolution protocol (ARP) and by causing the SDN network elements 160a-c to transform each distinct network flow to be consistent with the receiver's network view. The addressing services mentioned are merely examples of possible services that can be utilized to address nodes in embodiments of the present invention. For example, in IPv6 networks ICMP Neighbor Discovery Protocol can be utilized in place of DHCP. Static addressing instead may also be utilized. Another embodiment of the present invention would not change the host IP address, instead we would only change the apparent network configuration/view deeper in the network. Further embodiments of the present invention support naming services, address assignment service, address discovery services, addresses, and address translations services other than DNS, DHCP, ARP, IP address, and/or NAT. In general, embodiments of the present invention modify naming services and change the addresses on communications.

In an embodiment of the present invention, program code executed by the CINDAM server 190, in this embodiment, but on other network resources in further embodiments, manages all communication within the enclave (e.g., network, network resource(s), or portion of a network) it protects, as well as between the enclave and external clients.

Referring to FIG. 1, in an embodiment of the present invention, the devices that comprise the network are directly attached to an SDN network element 160a-160c that gives the program code the ability to modify and direct each packet. Program code executing on a processing resource of the CINDAM server 190, utilizes the SDN network elements 160a-160c running a DHCP service to provides the IP address for a client's view of the network and generates realistic yet deceptive network topologies using randomized topology templates. Program code executing on a processing resource of the CINDAM server 190, utilizes the SDN network elements 160a-160c running a DNS service to provide the client specific IP addresses for the other hosts in the client's view of the network. Program code executing on a processing resource of the CINDAM server 190, utilizes the SDN network elements 160a-160c running an ARP service translates from IP addresses to MAC addresses consistent with the specific network view.

In an embodiment of the present invention, utilizing these methods, the program code can synthesize routers and switches to create more realistic network views and to allow generation of more distinct network topologies and/or to perform network address translation so that the packet received will be consistent with the recipient's view of the network. In a network where multiple switches are involved, the network elements can also encapsulate the packet in a tunnel or in a transit network view, such as Multiprotocol Label Switching (MPLS), to enable delivery to the final destination network element port. A transit network view is one where the source switch/network element will translate the view to the transit view such that the routers will understand where to convey the packet to the delivery switch whereupon it will be translated again to the receiver's network view.

One advantage of isolating the program code that creates the deceptive network in a defined number of network elements, for example, in the CINDAM server 190 of FIG. 1, no other entity on the network need be aware that it is participating in a network utilizing aspects of the described method, so it will continue to operate normally without modification.

Figure 2:
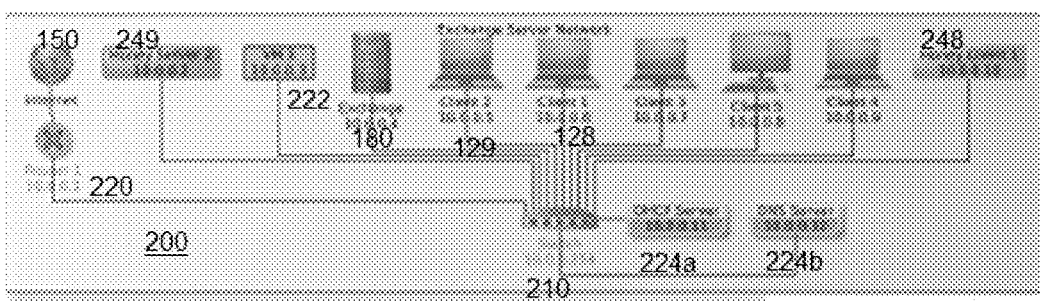
FIG. 2 depicts an example of a network view generated by an embodiment of the present invention from the perspective of a given host.

FIG. 2 is an example of a network view 200 generated by an embodiment of the present invention. In this example, the view of FIG. 2 is a network view 200 seen by an Exchange server 180 of the network of FIG. 1. The Exchange server 180 is utilized here as an example of an element of a network 100 for which embodiments of the present invention may create a customized view, the fact that it is an Exchange server 180 is not intended as a limiting characteristic.

This network view 200 in FIG. 2 looks different from the physical reality of the network 100 shown in FIG. 1. By integrating aspects of the present invention for network security, an observer on the Exchange server 180 sees a flat network with all devices connected to a single switch 210, and a single router 220 that allows this network to access the Internet 150. The Exchange server 180, running unmodified software on unmodified hardware, operates as if the depicted network 200 were the real network 100 (FIG. 1). Note that many devices on the physical network 100 (FIG. 1) do not appear on the Exchange server's network, i.e., the network view 200. For example, note that the VM host 115 (FIG. 1), the CINDAM server 190 (FIG. 1), and the printers 125a-12b (FIG. 1) are all not present and hence not accessible from the Exchange server 180. If the Exchange server 180 were to utilize passive monitoring (e.g., snooping) as well as active means, including but not limited to ARP requests, broadcast messages, DNS queries, etc., probes will return the same result as if the target was not connected to the network. The Exchange server 180 sees synthetic routers (e.g., router 220, FIG. 2) and switches (e.g., switch 210, FIG. 2), which do not exist on the physical network 100 (FIG. 1), only in the network view 200 generated by one or more programs executing on the CINDAM server 190.

In an embodiment of the present invention, one or more programs executing at the CINDAM server 190 utilizes the SDN elements 160*a*-160*c* to generate servers that are not a physical part of the network 100, but are present in the network view 200 of the Exchange server 180 (as well as any other network element for which a view is generated). The network view 200 of FIG. 1 includes a number of simulated elements, including a DHCP Server 224*a*, a DNS Server 224*b*, and some honeypots, a Honey Client 248 and a Honey Server 249. Additionally, as aforementioned, the router 220 and the switch 210 are synthetic elements.

As aforementioned, in embodiments of the present invention, the deceptive view deployed to the hosts along the network may can also include honeypots (e.g., a Honey Client 248 and a Honey Server 249), as shown in the Exchange server view of FIG. 2. Embodiments of the present invention make it easier for an attacker to stumble into a honeypot because the techniques used to avoid honeypots are less likely to work with the changing network views.

Figure 3:
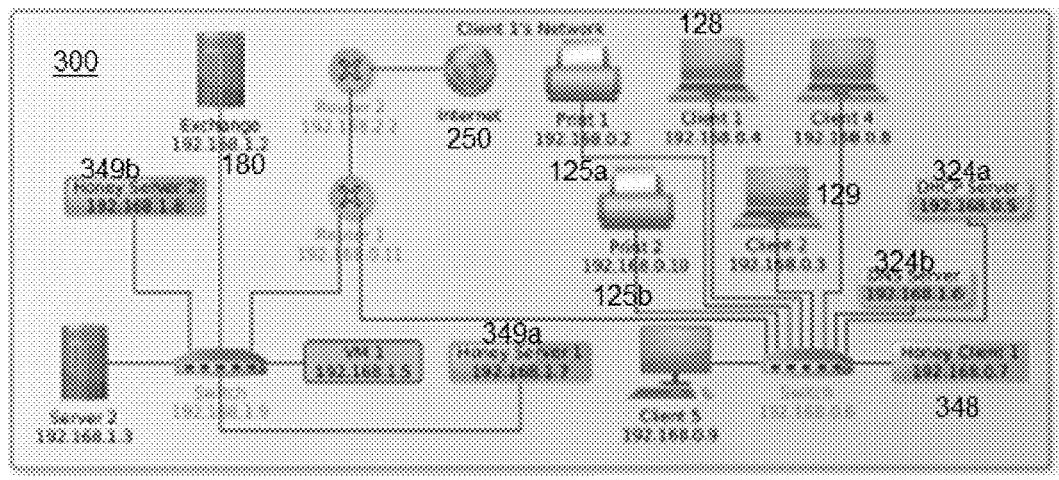
FIG. 3 depicts an example of a network view generated by an embodiment of the present invention from the perspective of a given host.

As aforementioned, in the present invention, the program code can vary the view such that each host and/or resource on the network has a different view 300 of the network 100 (FIG. 1), and one or more of these views is deceptive. FIG. 3 demonstrates this aspect as it depicts another view as seen by the host Client-1 128, in FIG. 1. As depicted in FIG. 3, this client 128, in contrast to the server view 200 in FIG. 2, observes a network (view 300) where clients and servers are segregated onto separate subnets and where routers mediate the connections between those subnets as well as providing access to the Internet 150. Note that the IP addresses for Client-1 128 and the Exchange 180 server in this view 300 (as labeled in FIG. 3) are different from the IP addresses in the Exchange server view 200 (FIG. 2). However, the two systems are still able to communicate with each other unimpeded. In this example, Client-1's 128 view includes printers not in the Exchange view 200 (FIG. 2), but excludes the host VM-3 222 (FIG. 2) that is in the Exchange server view 200 (FIG. 2). These deceptive views are managed by a deception policy. The policy may be centralized in an embodiment of the present invention, for example, managed by one or more programs of the CINDAM Server 190 (FIG. 1).

In an embodiment of the present invention, the deception policies may cause more fake servers (e.g., DNS Server 324*a*, DNS Server 324*b*, Honey Server 1 349*a*, Honey Server 2 349*b*) to appear on Client-1's view 300 (FIG. 3) than in the Exchange server's view 200 (FIG. 2) because, for example, user laptops, such as Client-1 128, are more likely to be compromised than locked-down servers, such as the Exchange server 180. There are also a different number of deceptive routers and switches. In this case, the different numbers are due to randomness, not likeliness of compromise.

In an embodiment of the present invention, the program code not only can generate a different network view for each device on a given network, it can also mutates one or more of the views over time. The program code can reconfigure the device's network view based either on different factors, including but not limited to, system configuration parameters (e.g., elapsed time), based on a human request (e.g., administrator input), and/or adaptively (e.g., in response to an attack or threat level). An advantage of embodiments of the present invention is that the program code does not have a requirement of mutating all hosts on a network at one instant. Rather, different hosts can be mutated at different times. For redundant servers, this aspect can be used to maintain apparent continuity of service. When it comes time to change one server's view, the program code can migrate/fail-over to the alternate server and change the view. When it comes time to change the other server's view, the program code can migrate/fail-over to the first server. This functionality can be applied to a cluster of servers all providing the service instead of redundant servers. In certain embodiments of the present invention, specific hosts cannot have their own IP address change, but the program code can support this limitation while continuing to mutate the remainder the network.

Figure 4:
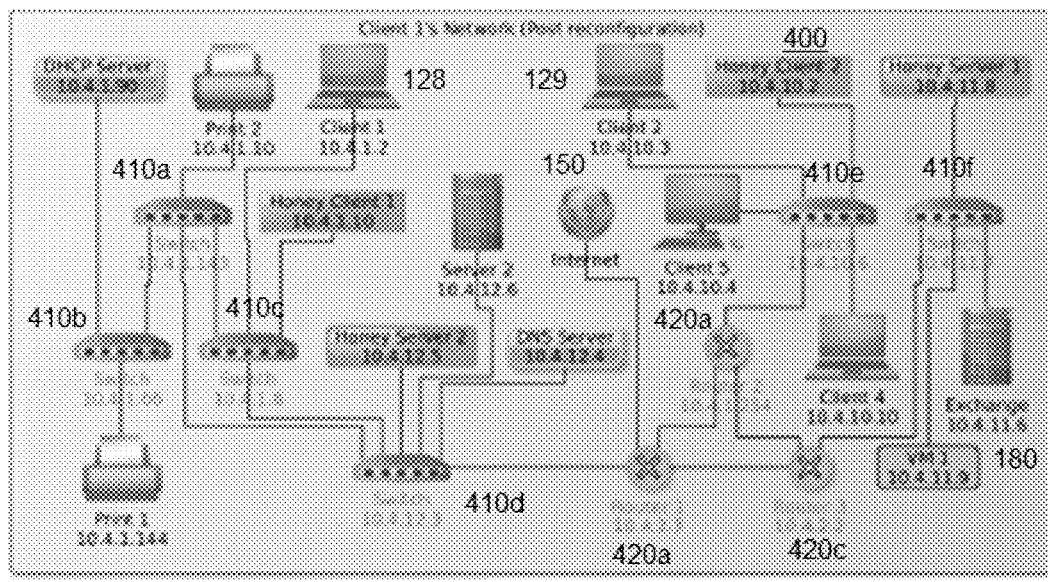
FIG. 4 depicts an example of a network view generated by an embodiment of the present invention from the perspective of a given host after a reconfiguration event.

For example, FIG. 4 depicts a view 400 of Client-1's 128 network generated by an embodiment of the present invention after a network view reconfiguration event. In this example, while the same hosts are on the network, the network topology differs as it now includes six switches 410*a*-410*f*, three routers 420*a*-420*c*, and with all of the IP addresses being different from the previous configuration. In an embodiment of the present invention, program code can reconfigure a view of the network for an individual hosts without requiring simultaneous reconfiguration of other hosts and/or while reconfiguring one or more additional hosts. In an embodiment of the present invention, reconfiguration, performed at selected DHCP lease renewal instances, is visible to the host being reconfigured, meaning that existing, long-lived, connections will break and must be re-established. In one aspect of the present technique, the reconfiguration interval can be specified in the program code and may vary between devices, depending upon what device is running this code, or even be affected by operational tempo.

In an embodiment of the present invention, reconfiguration events include, but are not limited to: a change in system configuration parameters, elapsed time, user input, an actual attack on a resource of the computing network and/or a reported attack on a resource of the computing network. Program code in embodiments of the present invention can reconfigure a view of a network node based on unsubstantiated reports of malicious behavior. This is possible because traditional countermeasures are typically too disruptive to take without substantiation, but because this reconfiguration is not disruptive, the program code in some embodiments of the present invention initiates reconfiguration based on a reported attack.

In an embodiment of the present invention, referring to the example that is FIG. 4, the program code utilizes DHCP to assign a new IP address (10.4.1.2), a new default router (10.4.2.3), and a new DNS server (10.4.12.4) to Client-1. Client-1 requests the DNS server for the IP addresses of the various servers with which it communicates and then proceeds to establish connections as normal. By utilizing this method, any reconnaissance information or attack trees that an attacker has established to achieve malicious goals will be incorrect and misleading.

While implementing various deception mechanisms on a network to create individualized and dynamic per-device network views, including but not limited to altering devices' IP addresses, adding fictitious devices and network elements, and hiding real devices, embodiments of the present invention also keeps the network working so that servers and clients with different views can communicate with each other and with the points external to the network. One benefit of the invention is that the security of the network resources are improved because an the perceived network topography that an adversary can detect via programmatic means is not the same as the physical configuration and thus, the services that an adversary can infect are not necessarily the real services in the environment. By deceiving the adversary into believing s/he has a valid representation of the attack surface, any plan based on such a representation is more likely to fail, and any attack is more likely to be detected.

In embodiments of the present invention, the program code may utilize additional techniques to in combination with those aforementioned in order to create a highly complex, but logically consistent deceptive environment.

As aforementioned, in embodiments of the present invention, the program code may re-address, servers, and other network elements in a way that is isomorphic to the physical network, but which presents an adversary with a view that is difficult to leverage. To a user, the IP address of a service is seldom important from a communications aspect. DNS provides the mapping from a name to the IP address in a way that allows users to be ignorant of the existence of IP addresses. After a reconfiguration, an adversary with a previously established map of client and server locations will not be able to invoke any prepared mechanisms against the environment since these will be based on invalid IP addresses. The adversary must repeat the reconnaissance performed previously to reconstruct the details of the image, thereby delaying any attack, and increasing the probability of discovery. In order to counter a situation where the basic structure of the view remained the same, e.g., the addresses were changed, but the relative positions and connections remained the same, where an adversary would be able to use the topology already discovered and learn the addresses for the resources of interest, an embodiment of the present invention may provide additional deception mechanisms to protect network resources from the attack.

In order to mitigate situations including, but not limited to, an adversary obtaining a point of presence and detecting additional points on the network by leveraging the point examining the traffic associated with its services, accessing Transmission Control Protocol (TCP) and the User Datagram Protocol (UDP) ports to which a detected point responds, and/or using traffic sniffing to inform port scanning, embodiments of the present invention may utilize one or more of the following defensive activities: 1) obscure the packets generated by services as part of their routine operations (e.g., discovery protocols), and/or 2) conceal the existence of particular network destinations that are not relevant to a specific host.

In an embodiment of the present invention, configuration rules on the CINDAM server 190 (FIG. 1) may specify which resources are to be hidden. In an embodiment where the control of the deceptive method is centralized, for example, on the aforementioned CINDAM server 190, the program code implements consistent fine-grained filters so that traffic from hidden hosts will not be visible to an observer within the view. Thus, even if the traffic from another node is concealed from the perspective of the attacker, if a hostname or destination address is somehow exposed via other means (e.g., configuration files or documentation on the host, or coordinated reconnaissance from other compromised nodes) CINDAM can ensure that such hosts are unreachable by answering a DNS query with a NO SUCH NAME response for a hidden host. If the attacker uses the IP address discovered in another view, it will not work in this view and can even be configured to lead to a honeypot to aid detection.

In an embodiment of the present invention, honeypot technology can be utilized in conjunction with some of the aspects disclosed. As familiar to one of skill in the art, a honeypot is a computer security mechanism set to detect, absorb, deflect, or, in some manner, counteract attempts at unauthorized use of information systems. In network security, honeypots may provide a powerful mechanism for diverting and distracting adversaries. While sophisticated adversaries have developed means to detect the presence of a honeypot and alter their behavior accordingly, embodiments of the present invention offer an advantage in network security by leveraging conventional honeypot solutions with network relabeling to create a combined solution. Because the program code causes each host to exist in a distinct network view, and changed the views over time, standard techniques adversaries use to detect honeypots (e.g., comparing resources used by multiple systems to discover those that are not used by anyone) may fail. The unique deceptive view increase the probability that an attacker will stumble into a honeypot on the deceptive network. Any traffic to these honeypots is a clear indicator of malicious activity.

In an embodiment of the present invention, if there is reason to believe a host may be compromised, the program code can remap the entire set of IP addresses belonging to that host's operational environment and reuse the compromised host's prior view's addresses, topology, and services therein to construct a honeypot configuration that mimics the operational environment. In this situation, the adversary may not realize the misdirection.

In an embodiment of the present invention, the program code constructs fictitious network elements (e.g., switches and routers) to present a more realistic network view (since all traditional networks have these elements) and allow a larger number of distinct views to be created. For example, the program code may simulate switches by injecting common switch traffic, such as spanning tree protocols. The SDN network elements may simulate intermediate routers by decrementing the time-to-live (TTL) and, if the TTL reaches zero, generating Internet Control Message Protocol (ICMP) TTL exceeded messages to support tools like traceroute.

An advantage of certain embodiments of the present invention is that the present technique can be deployed into an existing network with minimal changes to the existing network infrastructure and no changes to existing attached nodes. The methods utilized by the program code to deceive an attacker (e.g., NAT, dynamic addressing, dynamic DNS) are compatible with many networks, but the present invention combines elements of technologies with this compatibility to provide the described deception capabilities.

Embodiments of the present invention may be implemented in a network without making any changes to the peer participants. In general, a client attaches to the network and interacts with DHCP to obtain key information including its own IP address and the IP addresses of key services such as DNS. Next, it uses DNS to find the address of the server it would like to contact. It then uses ARP to determine the MAC address either for the server or for the next hop router, depending on whether the server is local or not. The packet is then transmitted via the upstream switch to that MAC address. The server replies using a similar process, although skipping DNS since the client's address is available via the IP header.

Figure 5:
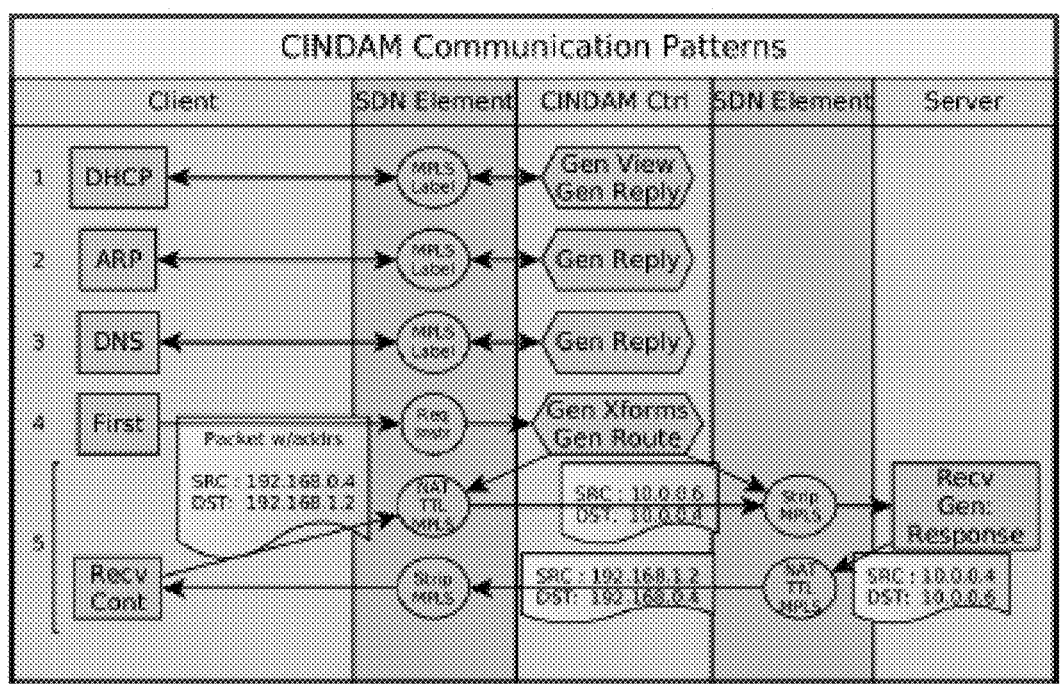
FIG. 5 provides an illustration of communications within a network utilizing aspects of an embodiment of the present invention.
Figure 6:
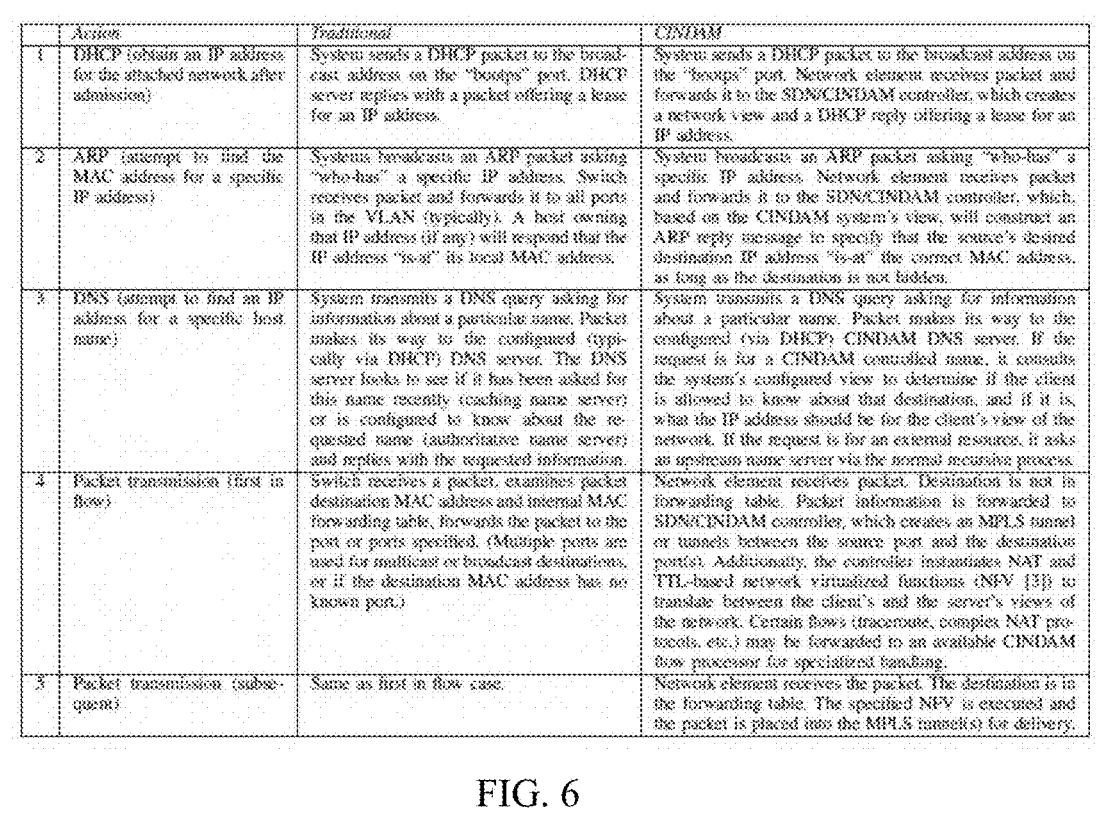

When a network 100 (FIG. 1) utilizes the present invention, for example, in the configuration shown at FIG. 1, clients and servers are entirely unaware of what is happening behind the scenes as the present invention enables communication for hosts with individualized deceptive views generated by the present invention. The following example is offered merely to illustrate this process. Client-1 128 (in the view 300 is shown in FIG. 3) connects to the network and attempts to access the internal Exchange server (whose view 200 is shown in FIG. 2). FIG. 5 and FIG. 6 detail of what happens at each step from different perspectives. For example, the packet IP addresses shown in rows 4-5 of FIG. 5 illustrates how IP addresses are mapped during a communication flow.

Referring to FIG. 6, the row numbers correspond with the row numbers in FIG. 5. FIG. 7 summarizes the efficacy of certain embodiments of the present invention against various attack elements in the cyber-kill chain. As noted in FIG. 7, embodiments of the present invention are effective against attacks that use multiple computers (including redirectors and pivot points), require network reconnaissance information, require planning or testing, construct command and control communication links, and/or assume a consistent or unchanging network configuration. These attack elements are all used in current nation-state attacks as well as criminal malware campaigns. Thus, FIG. 7 illustrates that embodiments of the present invention utilizes an approach that thwarts several elements employed in attackers' best-practice techniques.

Figure 8:
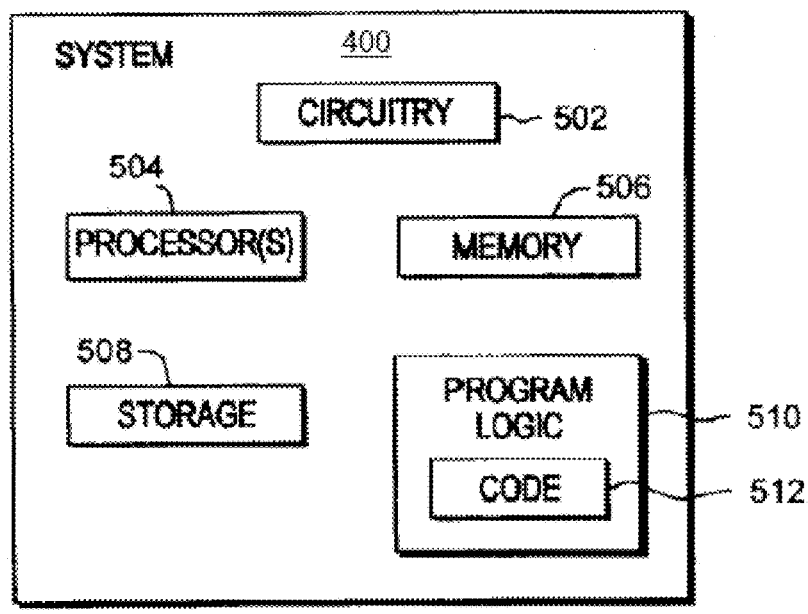
FIG. 8 depicts a computer system configured to perform an aspect of an embodiment of the present invention.

FIG. 8 illustrates a block diagram of a resource 400 in computer system, such as the CINDAM server 190, the Exchange server 180, and the host Client-1 128, depicted in FIG. 1 and discussed in subsequent figures. Returning to FIG. 8, the resource 500 may include a circuitry 502 that may in certain embodiments include a microprocessor 504. The computer system 500 may also include a memory 506 (e.g., a volatile memory device), and storage 208. The storage 208 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 8 shows the program logic 510 separately from the other elements, the program logic 510 may be implemented in the memory 506 and/or the circuitry 502.

Figure 9:
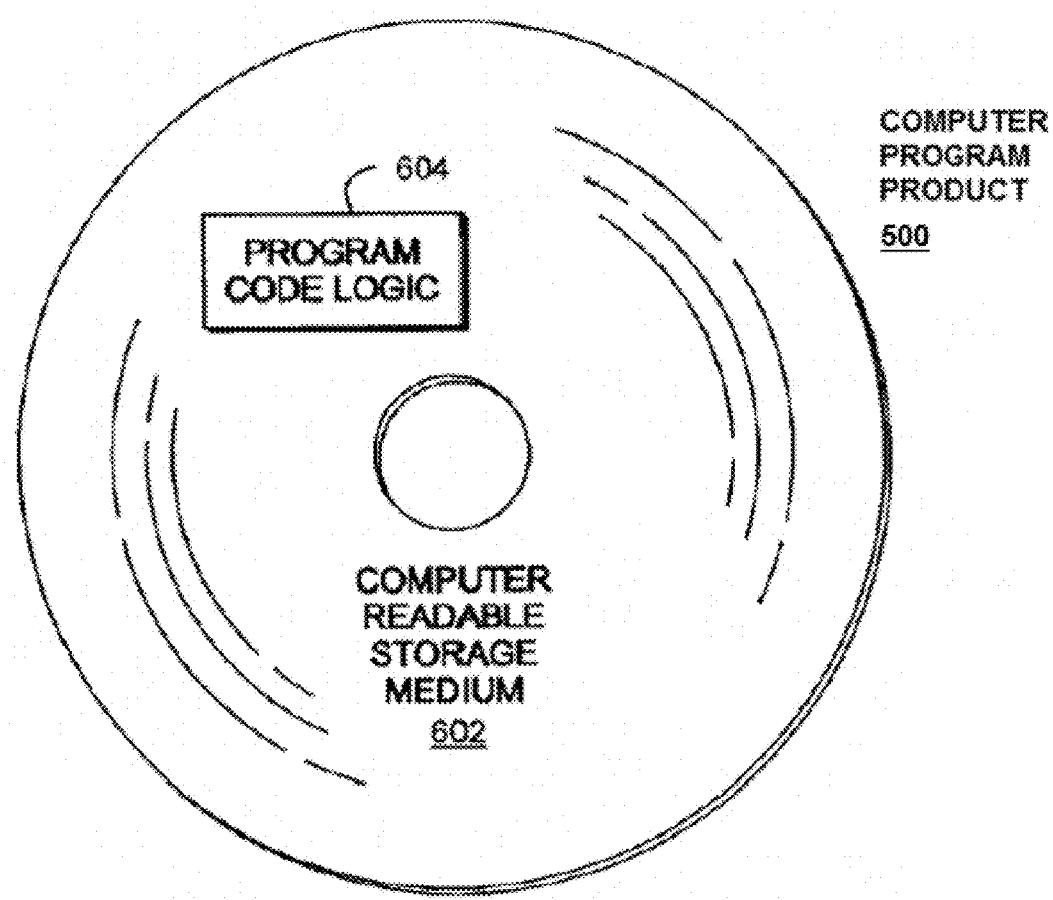
FIG. 9 depicts a computer program product incorporating one or more aspects of the present invention.

Using the processing resources of a resource 400 to execute software, computer-readable code (also referred to herein as program code) or instructions, does not limit where this code can be stored. Referring to FIG. 9, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

What is claimed is:

1. A computer-implemented method, comprising:
generating, by one or more processors, for a first network host on the computing network, a first virtual network topology view, wherein the first virtual network topology view of the first network host differs from a physical network topology of the computing network, wherein a network node perceives the computing network as comprising a network topology of the first virtual network topology view, the generating comprises:
modifying, by the one or more processors, naming and addressing services of network components communicatively coupled to the first network host, wherein the modified network components comprise network resources viewable by the first network host in the first virtual network topology view, wherein the modifying maintains communications connections between the network resources;
transforming, by one or more processors, network flows between the network resources viewable by the first network host in the first virtual network topology view, to be consistent with the first virtual network topology view;
deleting, by the one or more processors, one or more network resources of the network resources viewable by the first network host in the first virtual network topology view, from the first virtual network topology view, wherein the deleted one or more network resources are excluded from the first virtual network topology view;
based on the deleting, automatically filtering, by the one or more processors, traffic from the deleted one or more resources, wherein the filtered traffic is not visible to the first network host and to an observer within the first virtual network topology view; and
based on the deleting, responding, by the one or more processors, to queries received via the first network host, wherein the queries utilize identifiers of the deleted one or more resources, with an error.

2. The computer-implemented method of claim 1, further comprising:
managing, by the one or more processors, communications between the network resources viewable by the first network host in the first virtual network topology view.

3. The computer-implemented method of claim 2, further comprising:
managing, by the one or more processors, communications between any one of the network resources viewable by the first network host in the first virtual network topology view and an external client.

4. The computer-implemented method of claim 1, wherein modifying the addressing services comprises:
utilizing, by the one or more processors, a Dynamic Host Configuration Protocol (DHCP) service and randomized topology templates to provide Internet Protocol (IP) addresses for the network resources.

5. The computer-implemented method of claim 1, wherein modifying the addressing services comprises:
utilizing, by the one or more processors, a domain name system (DNS) service to provide IP addresses for the network resources.

6. The computer-implemented method of claim 5, further comprising:
utilizing, by the one or more processors, an address resolution protocol (ARP) service to translates the IP addresses to MAC addresses consistent with the first virtual network topology view.

7. The computer-implemented method of claim 1, further comprising:
obtaining, by the one or more processors, a notification of a network reconfiguration event; and
generating, by one or more processors, for the first network host on the computing network, a new first virtual network topology view.

8. The computer-implemented method of claim 7, wherein the reconfiguration event is selected from the group consisting of: a change in system configuration parameters, elapsed time, user input, and an actual attack on a resource of the computing network and a reported attack on a resource of the computing network.

9. The computer-implemented method of claim 1, further comprising:
generating, by one or more processors, for a second network host on the computing network, a second virtual network topology view, wherein the second virtual network topology view of the second network host differs from the physical network topology of the computing network and the first virtual network topology view of the first host, wherein a second network node perceives the computing network as comprising a network topology of the second virtual network topology view, the generating comprises:
modifying, by the one or more processors, naming and addressing services of network components communicatively coupled to the second network host, wherein the modified network components comprise network resources viewable by the second network host in the second virtual network topology view, wherein the modifying maintains communications connections between the network resources viewable by the second network host; and
transforming, by one or more processors, network flows between the network resources viewable by the second network host in the second virtual network topology view, to be consistent with the second virtual network topology view.

10. The computer-implemented method of claim 9, where the second virtual network topology view differs from the first virtual network topology view and the second network host is a network resource of the network resources viewable by the first network host in the first virtual network topology view.

11. The computer-implemented method of claim 10, further comprising:
obtaining, by the one or more processors, a notification of a network reconfiguration event;
generating, by one or more processors, for the first network host on the computing network, a new first virtual network topology view; and
maintaining, by the one or more processors, the second virtual network topology view.

12. The computer-implemented method of claim 1, the generating the first virtual network topology view, further comprising:
generating, by the one or more processors, one or more synthetic network elements, wherein the synthetic network elements are not in the physical network topology; and
including, by the one or more processors, the one or more synthetic network elements in the first virtual network topology view.

13. The computer-implemented method of claim 12, wherein the network resources viewable by the first network host in the first virtual network topology view are synthetic network elements.

14. The computer-implemented method of claim 1, wherein the filtering comprises utilizing consistent fine-grained filters.

15. The computer-implemented method of claim 14, wherein a portion of the one or more synthetic network elements comprises honeypots.

16. The computer-implemented method of claim 1, wherein the transforming comprises:
directing, by one or more processors, one or more Software Defined Networking (SDN) elements of the computing network, communicatively coupled to the first network host, to transform the network flows between the network resources viewable by the first network host in the first virtual network topology view, to be consistent with the first virtual network topology view.

17. A computer program product comprising:
a non-transitory computer readable storage medium readable by one or more processors and storing instructions for execution by the one or more processors for performing a method comprising:
generating, by the one or more processors, for a first network host on the computing network, a first virtual network topology view, wherein the first virtual network topology view of the first network host differs from a physical network topology of the computing network, wherein a network node perceives the computing network as comprising a network topology of the first virtual network topology view, the generating comprises:
modifying, by the one or more processors, naming and addressing services of network components communicatively coupled to the first network host, wherein the modified network components comprise network resources viewable by the first network host in the first virtual network topology view, wherein the modifying maintains communications connections between the network resources;
transforming, by one or more processors, network flows between the network resources viewable by the first network host in the first virtual network topology view, to be consistent with the first virtual network topology view;
deleting, by the one or more processors, one or more network resources of the network resources viewable by the first network host in the first virtual network topology view, from the first virtual network topology view, wherein the deleted one or more network resources are excluded from the first virtual network topology view;
based on the deleting, automatically filtering, by the one or more processors, traffic from the deleted one or more resources, wherein the filtered traffic is not visible to the first network host and to an observer within the first virtual network topology view; and
based on the deleting, responding, by the one or more processors, to queries received via the first network host, wherein the queries utilize identifiers of the deleted one or more resources, with an error.

18. The computer program product 17, the method further comprising:
obtaining, by the one or more processors, a notification of a network reconfiguration event; and
generating, by one or more processors, for the first network host on the computing network, a new first virtual network topology view.

19. The computer program product claim 18, further comprising:
generating, by one or more processors, for a second network host on the computing network, a second virtual network topology view, wherein the second virtual network topology view of the second network host differs from the physical network topology of the computing network and the first virtual network topology view of the first host, wherein a second network node perceives the computing network as comprising a network topology of the second virtual network topology view, the generating comprises:
modifying, by the one or more processors, naming and addressing services of network components communicatively coupled to the second network host, wherein the modified network components comprise network resources viewable by the second network host in the second virtual network topology view, wherein the modifying maintains communications connections between the network resources viewable by the second network host; and
transforming, by one or more processors, network flows between the network resources viewable by the second network host in the second virtual network topology view, to be consistent with the second virtual network topology view;
obtaining, by the one or more processors, a notification of a network reconfiguration event;
generating, by one or more processors, for the first network host on the computing network, a new first virtual network topology view; and
maintaining, by the one or more processors, the second virtual network topology view.

20. A system comprising:

a memory;

one or more processors in communication with the memory; and program instructions executable by the one or more processors via the memory to perform a method, the method comprising:

generating, by the one or more processors, for a first network host on the computing network, a first virtual network topology view, wherein the first virtual network topology view of the first network host differs from a physical network topology of the computing network, wherein a network node perceives the computing network as comprising a network topology of the first virtual network topology view, the generating comprises:

modifying, by the one or more processors, naming and addressing services of network components communicatively coupled to the first network host, wherein the modified network components comprise network resources viewable by the first network host in the first virtual network topology view, wherein the modifying maintains communications connections between the network resources;

transforming, by one or more processors, network flows between the network resources viewable by the first network host in the first virtual network topology view, to be consistent with the first virtual network topology view;

deleting, by the one or more processors, one or more network resources of the network resources viewable by the first network host in the first virtual network topology view, from the first virtual network topology view, wherein the deleted one or more network resources are excluded from the first virtual network topology view;

based on the deleting, automatically filtering, by the one or more processors, traffic from the deleted one or more resources, wherein the filtered traffic is not visible to the first network host and to an observer within the first virtual network topology view; and based on the deleting, responding, by the one or more processors, to queries received via the first network host, wherein the queries utilize identifiers of the deleted one or more resources, with an error.

* * * * *